United States Patent [19]

Mori et al.

[11] 4,141,613
[45] Feb. 27, 1979

[54] ELECTRICAL GENERATING SYSTEM, PARTICULARLY FOR AUTOMOTIVE USE

[75] Inventors: Kazumasa Mori, Aichi; Suguru Sato, Obu, both of Japan

[73] Assignee: Nippondenso Co., Ltd., Kariya, Japan

[21] Appl. No.: 814,875

[22] Filed: Jul. 12, 1977

[30] Foreign Application Priority Data

Jul. 14, 1976 [JP] Japan .................. 51-94139

[51] Int. Cl.² ............................................. H02J 7/14
[52] U.S. Cl. ........................................ 322/28; 320/64
[58] Field of Search ...................... 322/28; 320/64, 68

[56] References Cited

U.S. PATENT DOCUMENTS

| | | | |
|---|---|---|---|
| T939,015 | 10/1975 | Itoh | 320/64 |
| 3,553,563 | 1/1971 | Kawashima | 322/28 X |
| 3,597,654 | 8/1971 | Harland, Jr. et al. | 320/64 X |
| 3,855,517 | 12/1974 | Allport | 322/28 X |
| 3,942,097 | 3/1976 | Itoh et al. | 322/28 |
| 3,983,471 | 9/1976 | Itoh et al. | 320/64 X |

*Primary Examiner*—Robert J. Hickey
*Attorney, Agent, or Firm*—Flynn & Frishauf

[57] ABSTRACT

To prevent unusually high or low voltage output from an automotive-type alternator, in case of failure of connection from the alternator rectifier output to the automotive vehicle battery, a connecting network is provided connecting an auxiliary alternator output terminal to the voltage sensing circuit to control the voltage sensing circuit to in turn control the field current to the alternator to prevent excessive output voltages. Additionally, a further voltage sensing circuit is connected to the auxiliary terminal to provide limited energization to the field for self-excitation of the generator if the vehicle engine, driving the generator is started, for subsequent transfer of control to the main voltage sensing circuit, but to prevent continuous field current flow at full field current value to prevent burnout of the field in case the engine is not started, but the main vehicle switch, typically the ignition switch, is left closed.

9 Claims, 1 Drawing Figure

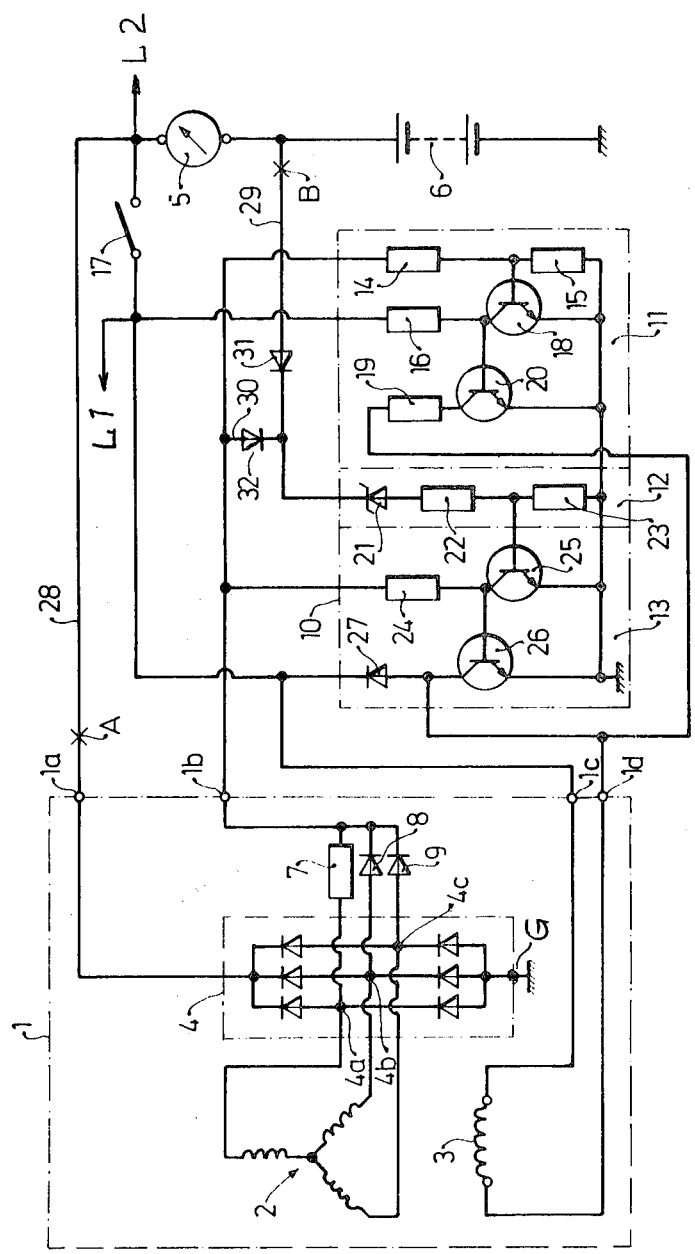

ELECTRICAL GENERATING SYSTEM, PARTICULARLY FOR AUTOMOTIVE USE

The present invention relates to an electrical generating system and more particularly to an electrical generating system adapted for automotive use in which a multiphase, typically a three phase alternator is driven by an automotive engine to supply loads of an automotive vehicle and, additionally, to charge a battery which normally floats across the output of the generator.

Three phase alternators, driven by automotive engines, and connected to rectifiers to supply d-c output to batteries are currently standard equipment in most automotive vehicle electrical systems. To maintain the voltage level of the alternator constant over the wide swings of driving speed of the alternator, as the speed of the engine changes, voltage regulators are included in the alternator field circuit to, selectively and cyclically, connect and disconnect the field from current supply from the alternator supplied battery connected vehicle on-board network. Trouble with such systems can arise, however, if there should be a break in a wire or connection between the alternator and the floating battery, or if there should be other malfunctions in the electrical network.

SUBJECT MATTER OF PRESENT INVENTION

It is an object of the present invention to provide an electrical generating system, and especially a circuit or network for an alternator-rectifier-battery-voltage regulator power supply system in which unusual and undesired voltage variations delivered by the generator are avoided, and which preferably additionally provides for reliable and safe operation of the system even under conditions of misuse by an operator.

Briefly, the alternator is connected to a main power rectifier, typically a three phase alternator connected to a 6-diode full wave rectifier, so that output power can be delivered from the generator at a d-c output terminal. Additionally, an auxiliary output terminal is provided which, for example, is connected to a common point and to the armature windings of the alternator and has a diode, or diode-resistance combination network and providing output voltage at an auxiliary terminal, which auxiliary terminal is connected through a connecting network to the main voltage sensing circuit, so that the auxiliary d-c terminal can provide an auxiliary sensing voltage in case of failure of connections from the main output terminal of the alternator-rectifier combination to the battery or the on-board network of the vehicle, respectively, or other failure of connection within the vehicle network which might affect the voltage regulator and prevent its regulating operation, absent the additional connecting network. Preferably, the connecting network includes a diode which is so connected and poled that, under normal operations, it is cut off, or blocked, to prevent feedback of control action from the main output terminal to the auxiliary output terminal, and vice versa. Upon failure, or unusual operating voltages at the main sensing circuit connection of the voltage regulator, however, the sensing voltage will be transferred through the diode to the voltage sensing circuit of the regulator.

In accordance with a feature of the invention, an additional voltage sensing circuit is provided and connected to control current flow through the field, at the current level which is, however, below that of rated current carrying capacity so that current flow can continue uninterruptedly without damage to the field. This additional voltage sensing circuit can be so connected to the battery that it is effective upon closing of the starting switch and even before any output voltage is derived from the alternator so that alternator will be immediately sense excited upon closing of the ignition switch of the vehicle. Should the operator, however, then fail to start the vehicle, no damage will result since current flow through the field is limited. After starting of the vehicle and when normal output voltage is obtained from the alternator — assuming proper function thereof and of the electrical network of the vehicle — the voltage regulator of the system will control the output voltage of the a-c generator-rectifier combination.

The drawing: the single FIGURE illustrates the invention, embodied in an electrical circuit diagram showing a practical embodiment of a generating network.

The alternator, or a-c generator 1 is driven by an automotive internal combustion engine, that is, at widely varying speeds. The output of the alternator 1 is available at three terminals, 1a, 1b, and G, forming a ground, chassis, or reference terminal connection. Alternator 1 supplies power to a battery 6 through a rectifier 4. The alternator has a three phase, star connected armature 2, a field winding 3 and the rectifier bank 4, which may be one structural unit. The a-c input terminals 4a, 4b, 4c are connected to the output terminals of the armature winding 2. The main output terminal 1a of the alternator is connected through an output power bus 28 and a charging Ammeter 5 to the battery 6. A load L2 can be connected at the junction of bus 28 and meter 5 to loads which are to be supplied permanently, for example vehicle lights, controlled by individual switches. The alternator additionally has an auxiliary output terminal 1b. Diodes 8 and 9 are connected between the a-c terminals 4b, 4c and auxiliary output terminal 1b. The third rectifier terminal 4a is connected through a resistor 7 to the auxiliary output terminal 1b. Thus, terminal 1b is connected to the various phases through a combination resistor-diode network. The field 3 is connected to two field terminals 1c, 1b.

The voltage regulator 10 includes three main circuits or networks, namely a starting excitation network 11, a main voltage sensing network 12 and an excitation control network or circuit 13. The starting excitation network has a voltage divider formed by resistors 14, 15, connected between the auxiliary terminal 1b and reference or chassis G. A transistor 18, the base of which is connected to the junction or tap point of the voltage divider resistors 14, 15 has it emitter connected to reference and its collector through a collector resistor 16 to the ignition switch 17, the other terminal of which is connected to bus 28. Loads which are to be controlled by the ignition switch 17 and schematically shown by arrow L1 can be connecte to the junction of resistor 16 and ignition switch 17. Transistor 18, which is a npn transistor, has its collector additionally connected to the base of npn transistor 20, the emitter of which is connected to ground or chassis, and the collector through a current limiting resistor 19 to terminal 1d connected to the field 3 of the alternator. The voltage sensing circuit 12 includes a voltage divider formed by resistors 22, 23 and a Zener diode 21. The series circuit formed by the voltage divider 22, 23 and the Zener diode 21 is connected to a first voltage sensing bus 29, a terminal of which is directly connected to battery 6. An additional connecting circuit 30 connects the voltage sensing bus 29 to the auxiliary output terminal 1b of the alternator 1.

The voltage regulator circuit or network 13, as such, has a npn control transistor 25, the base of which is connected to the tap of the voltage divider 22, 23 of the sensing network 12. The collector of transistor 25 is connected through collector resistor 24 with the auxiliary output terminal 1b of the alternator 1, and further to the base of a npn transistor 26, the collector of which is connected to the field terminal 1d. The emitters of the transistors 25, 26 are connected to chassis. The second field terminal 1c is connected to the ignition switch 17. An anti-inductive kick diode 27, forming a free wheeling diode is connected across the field 3. As can readily be seen the emitter-collector circuit of the transistor 20 in network 11 is connected in parallel to the emitter-collector circuit of transistor 26 in the regulator network 13. The current flow through transistor 20 is, however, limited by the presence of the resistor 19.

The two buses, or terminals from which voltage can be sensed, namely the bus 29 and the connection 30 have diodes 31, 32 inserted therein in such a manner that the cathode of the respective diodes is connected to the voltage sensing circuit 12.

Operation: let it be assumed that the vehicle in which the system is used is stopped and that switch 17 forms the ignition switch and is open. Upon closing of switch 17, the following excitation control circuit will be established:

battery 6 — AMmeter 5 — ignition switch 17 — resistor 16 of initial excitation circuit 11, base-emitter junction of transistor 20 — ground or chassis.

As a consequence transistor 20 will become conductive. As transistor 20 becomes conductive, the following starting excitation circuit will be established:

battery 6 — meter 5 — ignition switch 17 — field terminal 1c — field 3 — field terminal 1d — resistor 19 — collector-emitter path of transistor 20.

As a consequence, excitation current will flow through the field 3, the value of which is determined by the resistance of the network which includes the resistance of resistor 19.

Let it be assumed that the operator of the vehicle then starts the engine by operating a starter switch (not shown) so that an alternating field is applied to the armature 2. Three phase output voltages will appear at the terminals 4a, 4b, 4c, which voltage is rectified by the full wave rectifier 4 and supplied through Ammeter 5 to battery 6. At the same time, the combination of the diodes 8, 9 and resistor 7 together with the diodes at the load side of the rectifier 4 provide a second output voltage at terminal 1b. This second output voltage at terminal 1b provides base current through resistor 14 to transistor 18 of the initial excitation circuit 11. As a consequence, transistor 18 will become conductive, so that transistor 20 will be blocked since the base voltage of transistor 20 will drop to approximately the reference voltage. Further, the transistor 26 of the main voltage regulator 13 will be controlled to become conductive since base current is applied from terminal 1b through resistor 24. Transistor 25 will remain blocked. As transistor 26 becomes conductive, the field can now receive full field current through the controlled field supply circuit: battery 6 or output from rectifier 4 at terminal 1a of alternator 1 — ignition switch 17 — field terminal 1c — field 3 — field terminal 1d — collector-emitter path of transistor 26 — reference or chassis. The alternator, being driven by the engine, now will operate as a self-excited alternator. The field 3 will have current flowing therein which is determined only by the network parameters of the operating exciting circuits, that is, the resistance of the field 3 and the associated components, but not by the resistor 19. Consequently, the output voltage of the alternator 1 will rise rapidly.

As the output voltage at the terminals 1a and G, which also form the terminals of the battery 6 — neglecting the resistance of the AMmeter 5 — rises above a predetermined level, determined by the network parameters of the voltage sensing circuit 12, Zener diode 21 will break down. The voltage at the voltage division point of the divider 22, 23 will rise. Consequently, transistor 25 will become conductive which blocks transistor 26 since the base terminal of transistor 26 will drop to effectively reference potential. Blocking of transistor 26 interrupts the operating exciting circuit by breaking the connection to chassis and no further current will be supplied to the field 3. Current can continue to flow through the free wheeling diode 27 until it decays in accordance with the decay curve of the field 3. The voltage of the alternator 1 will, therefore, drop. When the voltage at the terminals across the battery 6 has dropped below the predetermined reference level of the voltage sensing circuit 12, Zener diode 21 will recover, cutting off the voltage divider 22, transistor 25 will block and permit resistor 24 again to supply output voltage from terminal 1b to the base of transistor 26. Field current again will be supplied and the voltage of alternator 1 will rise.

The ON-OFF cycles of current flow through the field 3 will repeat as the voltage across the battery 6 hunts about the predetermined level. Consequently, the output voltage of the alternator is controlled to the level determined by the parameters of the voltage sensing circuit 21.

The auxiliary network formed by resistor 7 and diodes 8, 9, connected to the auxiliary terminal 1b has the advantage that a small voltage of about 2-3 volts can be applied, with good effectiveness, to the base of transistor 26 and also to transistor 18 as soon as the alternator begins to turn. Thus, the speed at which the alternator begins to excite itself is low. The base current applied to transistor 26 is determined by the resistance of resistor 7 and 24 and by the voltage drop of the base-emitter junction of transistor 26, which is about 0.6V. It is possible to use a diode instead of the resistor 7; the diode introduces an additional fixed voltage drop, however, of about 0.8V and this increases the base current of the transistor 26. Consequently, the voltage of the generator does not increase as rapidly, causing transistor 26 to become conductive, than in the circuit as proposed with a resistor 7. The resistance of resistor 7, of course, should be suitably selected and should not be too low. For a 12V system, 100 Ohms is suitable.

The speed at which the self-excitation of the alternator commences can be held low, which permits limiting the external excitation current derived through transistor 20 and resistor 19. Thus, the continuously connected current through the field 3 can be limited by selecting the resistance of resistor 19 of its efficiently high value so that the current consumption, or drain from battery 6 can be limited, permitting incorporation of the resistor 19 into a completely electronic, and enclosed unitary voltage regulator system. The heat dissipated by resistor 19 thus can also be limited.

In operation of the system, it is possible that malfunction arises due to line or wire breaks. Typical interruptions occur in the connecting lines, for example adjacent junctions or terminals which break due to vibration or other disturbances or malfunctions. For example, the output bus 28 may be interrupted at point A; another point of interruption is that of bus 29 at point B. In accordance with the present invention, the effects of wire breaks at these points, for example, will not affect the operability of the system, however.

The connecting network formed by bus 30, which includes the diode 32, in combination with the regulator 10 as shown and described provides for application of voltage from the auxiliary terminal 1b to the sensing network 21 even if there should be an interruption at point B or at point A, or both. It prevents excessively high voltages from occurring since the auxiliary output terminal 1b will be connected through the diode 32 of the connecting network 30 to the voltage sensing circuit or network 12 to control the output of alternator 1. The diode 31, 32 are poled, and have the function to prevent reverse current flow. Diode 31 could, theoretically, be replaced by a high resistance resistor. Diode 32 can be replaced by a series circuit of a plurality of diodes, or a combination of series connected one or more diodes and one or more resistors, in order to provide accurate control of the voltage being applied to the voltage sensing network 12, and hence operation of the transistor 25 and the voltage sensing network 12 itself.

The circuit has an additional safety feature. It is customary to open the ignition switch 17 when the engine is to be stopped. The situation may occur, however, that the engine will have been stopped, for example, by being choked off, or otherwise, and the ignition continues to be connected. If the ignition is closed, and the engine does not run, the alternator is likewise stopped and will not supply output voltage at either the main terminal 1a or the auxiliary terminal 1b. As a consequence, transistor 18 of the initial excitation network 11 and the transistor 16 of the operating voltage regulator network 13 will be blocked; the base voltage of the transistor 20 of the initial excitation circuit 11, however, will be supplied by power through the ignition switch 17, so that transistor 20 will become conductive. Current will then flow through the field winding 3 of the alternator 1 in accordance with the initial excitation circuit, which current will be limited, however, by the limiting resistor 19. If, therefore, the operator forgets to turn off ignition 17 with the engine stopped, current drain on the battery 6 will not be excessive because current flow through the field is limited by resistor 19; likewise, continued long current flow through the field will not cause undue heating of the field winding and thus protect the field 3 of the alternator 1 against burn-out.

The limiting resistor 19 can have a resistance value which is so selected that, in view of the battery voltage, an initial excitation current in the order of about 100mA will flow. This current drain does not materially or rapidly discharge the battery even if the ignition switch 17 should be left connected for some period of time without operation of the engine, and thus generation of power by generator 1 to charge the battery 6.

Various changes and modifications may be made within the scope of the inventor's concept.

We claim:

1. Electrical generating system, particularly for automotive use having a multiphase generator having armature windings (2) and a field winding (3);

a full wave power rectifier (3) connected to the armature windings, and connected to a main d-c output terminal (1a);

a rectifier network (7, 8, 9) connected to the armature winding and to an auxiliary d-c output terminal (1b);

a battery (6) connected to the main d-c output terminal (1a);

a main controlled semiconductor switch (26) connected in series with the field winding (3) and controlling current through the field winding;

a main voltage sensing circuit (12; 21, 22, 23) connected to the main d-c output terminal and hence to the battery, connected to and controlling conduction of said main controlled semiconductor switch (26) to maintain the output voltage of the alternator, as rectified, at an essentially constant, predetermined level;

a connecting network (30, 32) connecting the main voltage sensing circuit (12) to the auxiliary d-c terminal (1b) to provide a sensing voltage for the main sensing circuit (12) in case of failure of connections from the main d-c output terminal (1a) to the main voltage sensing circuit (12), an auxiliary semiconductor controlled switch (20) and a dropping impedance (19) connected in series therewith, said auxiliary semiconductor switch (20) and dropping impedance (19) forming an auxiliary field supply series circuit (6-17-1c-3-1d-19-20), the auxiliary field supplied series circuit being connected in parallel to the main controlled semiconductor switch (26); and an auxiliary voltage sensing circuit (11; 14, 15, 18) having a sensing threshold voltage which is lower than said predetermined voltage level, connected to sense output voltage of said auxiliary d-c output terminal (1b) and connected to and controlling conduction of the auxiliary controlled semiconductor switch (20) to provide current through the auxiliary field supply series circuit at a level which is below rated field current due to the presence of the dropping impedance in the series circuit.

2. Electrical generating system according to claim 1, wherein the system includes a main connecting switch (17);

the main sensing circuit (12) being connected through said main connecting switch (17) to the main d-c output terminal (1a) and hence to the battery, whereby the connecting network (30, 32) will provide a sensing voltage in case of failure of any circuit component, or connection between said main sensing circuit (12) and the main generator output (1a) or the battery (6).

3. Electrical generating system according to claim 2, wherein the connecting network includes at least one diode (32).

4. Electrical generating system according to claim 1, wherein the system includes a main connecting switch (17);

the main sensing circuit (12) being connected through said main connecting switch (17) to the main d-c output terminal (1a) and hence to the battery, whereby the connecting network (30, 32) will provide a sensing voltage in case of failure of any circuit component, or connection between said main sensing circuit (12) and the main generator output (1a) or the battery (6).

the auxiliary semiconductor switch (20) being additionally controlled to conduction upon closing of the connecting switch (17) in the absence of output voltage at the output terminals (1a, 1b) of the alternator to provide for limited field current flow through said series circuit from the battery and provide initial excitation for the generator, said limited field current, due to the presence of the series resistor protecting the field winding (3) in case of continued closing of the switch (17) without rotation of the generator and hence provision of output voltage.

5. Electrical generating system according to claim 4, wherein the voltage response level of the auxiliary sensing circuit is sufficiently below said predetermined voltage and said auxiliary sensing circuit controls the auxiliary semiconductor switch (20) to cut off and hence disconnect said series circuit to provide for full control of field current by the main semiconductor switch upon normal operation of the generator.

6. Electrical generating system according to claim 1, wherein the generator (1) is a three-phase alternator;

and the auxiliary terminal (1b) is connected to the three phases by a resistance-diode parallel circuit (7, 8, 9) to provide a minimum output voltage at said auxiliary terminal (1b) even upon slow rotation of said alternator at speeds well below minimum rated operating speeds.

7. Electrical generating system according to claim 6, wherein said resistance means and diode means comprises a resistor connected between one phase output of the alternator and said auxiliary terminal (1b);

and at least one diode (8, 9) connected between another phase terminal (4b, 4c) of the alternator, and said auxiliary output terminal (1b).

8. Electrical generating system according to claim 5, wherein the generator (1) is a three-phase alternator;

and the auxiliary terminal (1b) is connected to the three phases, selectively, by resistance means (7) and diode means (8, 9), respectively, to provide a minimum output voltage at said auxiliary terminal (1b) even upon slow rotation of said alternator at speeds well below minimum rated operating speeds.

9. Electrical generating system according to claim 4, wherein the auxiliary controlled semiconductor switch (20) and the auxiliary voltage sensing circuit (11), the main voltage sensing circuit (12) and the main controlled semiconductor switch (26) form a composite voltage regulator unit (10) having a control connection to said auxiliary terminal (1b) and to a main voltage sensing bus (29) connected to the battery, and having an additional terminal (1d) for connection to the field (3) of the generator (1).

* * * * *